United States Patent

Yamamoto et al.

[11] 3,949,039
[45] Apr. 6, 1976

[54] METHOD FOR PELLETIZING SYNTHETIC RESINS HAVING A HIGH MELTING POINT

[75] Inventors: Michiaki Yamamoto; Tsutomu Hashimoto, both of Hiroshima, Japan

[73] Assignee: Japan Steel Works, Ltd., Tokyo, Japan

[22] Filed: Nov. 8, 1974

[21] Appl. No.: 522,266

Related U.S. Application Data

[63] Continuation-in-part of Ser. No. 331,875, Feb. 12, 1973, abandoned.

[30] Foreign Application Priority Data

Apr. 3, 1972 Japan................................ 47-32598

[52] U.S. Cl. ............................................. 264/142
[51] Int. Cl.² ......................................... B29B 1/03
[58] Field of Search................... 264/142, 141, 143; 425/314, 467, 461, 382

[56] References Cited

UNITED STATES PATENTS

| | | | |
|---|---|---|---|
| 2,401,236 | 5/1946 | Fielitz................................. | 425/382 |
| 2,614,290 | 10/1952 | Street.................................. | 425/382 |
| 3,174,183 | 3/1965 | Siegel................................. | 425/461 |
| 3,341,892 | 9/1967 | Mayner............................... | 425/382 |
| 3,436,449 | 4/1969 | Treu et al. .......................... | 264/142 |
| 3,544,525 | 12/1970 | Balint et al........................ | 260/75 M |

*Primary Examiner*—Robert F. White
*Assistant Examiner*—James B. Lowe
*Attorney, Agent, or Firm*—Wenderoth, Lind & Ponack

[57] ABSTRACT

Synthetic resins are extruded through nozzles of a die under water, each nozzle having a straight bore having an inner diameter of 3 mm or above at a velocity of at least 1.0 m/sec. and cut into pellets under the water in front of the exits of the nozzles.

2 Claims, 4 Drawing Figures

METHOD FOR PELLETIZING SYNTHETIC RESINS HAVING A HIGH MELTING POINT

This application is a continuation-in-part of application Ser. No. 331,875 filed Feb. 12, 1973, now abandoned.

BACKGROUND OF THE INVENTION

The present invention relates to a method for pelletizing synthetic resins, and more particularly to a method for pelletizing synthetic resins having a relatively high melting point, e.g. 200°C. or more, by an under-water cut process using extruders.

It has been long known that, if the length (1) of the die is selected to be more than 8 times the diameter d of the die nozzle, the synthetic resins are extruded in laminar flow without being subjected to melt fracture, Barns effect or nozzle end effect, etc.

However, in reality, the length of the die varies due to its provision with a die jacket, as well as the construction to resist the resin pressure. Further, it varies also with the dimension of the extruders.

Accordingly, the length of the die is generally selected to be 10 to 15 times the diameter of the die nozzle and, at the same time, the resin pressure is considered when determining the land width of the die nozzle.

Recently, a remarkable development has been made in the field of the synthetic resin industry, and various kinds of very excellent synthetic resins have been produced. Among them are resins which have relatively high melting points compared with the conventional ones. These high melting point resins include, for example, nylon, polyester resin, etc.

Further, in the case of supplying synthetic resins from the maker to the processor, it has now become common practice to deliver them in pelletized form, because handling is convenient and the packing and transporting costs become more economical as the materials' bulk specific gravity becomes smaller.

In this point, there are many processes for pelletizing the synthetic resins, typical ones being listed as follows:
 a. sheet cut process;
 b. strand cut process;
 c. hot cut process; and
 d. under-water cut process.

In the case of pelletizing synthetic resins having a high melting point such as stated above, hitherto either the sheet cut or the strand cut process has been generally adopted. However, neither can achieve satisfactory pelletization of such resins due to the fact that their viscosity is relatively low in their melted state. Thus, the control of the cooling velocity or taking up velocity, etc., of sheet-form or strand-form resins after the extrusion through nozzles of a die is so difficult that the thickness of sheets or the diameter of strands is subject to variation. Pellets produced from such sheets or strands become uneven and breaks often occur during the take-up operation. Further, these cut processes, also known as a cold cut process, require a number of manual manipulations in conducting the resin out of the die through the cooling water tank to the cutting device along with noise therein, among other defects.

Further, the resin industry is recently tending toward labor saving through development of equipment with a large processing capacity. For this purpose, it has been well-known that the under-water cut process is the most suitable one. However, it has been regarded as impossible to pelletize the synthetic resins having a high melting point by such an under-water cut process, because it has been developed solely for pelletizing synthetic resins having a relatively low melting point, so that nobody has ever contemplated to use such a process for this purpose. The reason for the nonuse of this under-water cut process is that since the die surface is always under water, warm or cold, the temperature of the surface of the die is very low compared with the melting point of the resins having a high temperature, so that the resins set and clog the nozzles of the die. Finally, in order to obtain pellets having a diameter of 3 to 3.5 mm, as generally marketed, the die nozzles have a diameter of 2 to 2.4 mm.

SUMMARY OF THE INVENTION

It is an object of the present invention to provide a method for pelletizing synthetic resins having a high melting point by the use of the under-water cut process that has hitherto been believed inapplicable to this purpose, and yet is most suitable for treating them in large quantity.

A method for pelletizing synthetic resins having a high melting point according to the present invention is characterized in that they are extruded under the water through nozzles of a die, each nozzle having a straight bore of an inner diameter above a definite value, at a velocity above a definite value, and cut into pellets under the water in front of the exits of the nozzles.

BRIEF DESCRIPTION OF THE DRAWINGS

Other objects and advantages of the present invention will become apparent from the following description taken in conjunction with the accompanying drawings, wherein are set forth by way of illustration and example an embodiment of a die suitable for carrying out the method according to the present invention, together with a conventional die, in which.

DESCRIPTION OF A PREFERRED EMBODIMENT

As the result of repeated experiments, the inventors found that even with synthetic resins having a high melting point, they can be pelletized by the under-water cut process so long as they are extruded under certain conditions. The shape of pellets of synthetic resins having a relatively low melting point manufactured by a conventional under-water cut process generally takes the form of spheres having a diameter of about 3 mm, or cylindrical columns having a diameter of 3 mm and a length of about 3 mm, or flat discs having a diameter of about 3 mm and thickness of about 3 mm.

In the method according to the present invention, pellets having substantially the same shapes as those obtained by the conventional process as stated above are produced. The inventors found that those pellets can be obtained by the optimum selection of the shape of the nozzle of the die and the passing through velocity of the resins through the nozzles.

The method according to the present invention will be fully explained below by comparing it with the conventional methods.

Figure 1:
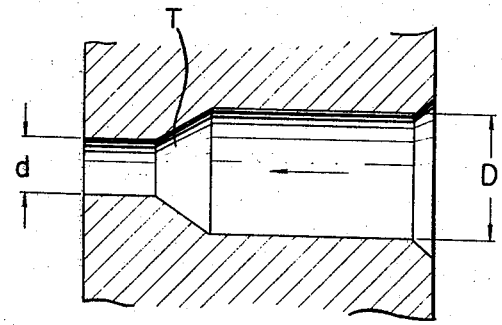
FIG. 1 shows, in section, a conventional die.
Figure 2:
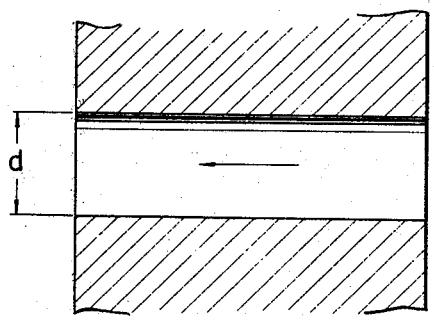
FIG. 2 shows, in section, an embodiment of a die suitable for carrying out the method according to the present invention.

First, referring to FIGS. 1 and 2 which schematically show in section the shapes of nozzles of the conventional die and those of the die suitable for use in association with the present invention, respectively, the notations $D$ and $d$ show the inner diameters of a nozzle and the arrow designates the direction of the flow of the resins. As is apparent from FIG. 1, the shape of the nozzle of the conventional die is such that it has, at the entrance portion, an inner diameter $D$. At the mid portion of the thickness, it converges toward an inner diameter of $d$, which is the diameter of the outlet portion, by means of a throttled portion $T$ between the diameters $D$ and $d$. Further, the sizes of the diameters $D$ and $d$ in order to obtain the pellet shapes and sizes as abovesaid are generally 4–6 mm and 2 – 2.4 mm for $D$ and $d$, respectively.

The nozzle according to the present invention has, in contrast and as shown in FIG. 2, a constant diameter of $d$ throughout the thickness of the die, whereby $d$ is defined to be at least 3 mm. Nozzle diameters of 2 to 2.4 mm have been developed principally for resins of polyolefin base, and resins such as PETP, PA-66, etc. have been found difficult to pelletize under water using such a diameter, but when the nozzle diameter is selected to be larger than 3 mm, as in the present invention, the pelletizing of even such resins is made possible. That is, it is critical that the nozzle diameter be greater than 3 mm. The dimension of $d$ is determined depending on the requirements of the sizes of the pellets, and though $d$ below 3 mm cannot be utilized for attaining the object of the present invention, the diameter can be larger than 3 mm without inconvenience as the size of the pellets required becomes larger, but 50 mm is considered tentatively to be the maximum, judging from the practical demands in the market of the pellets at present.

As to the velocity of the resins extruded through the nozzle, the inventors found that it is necessary to be at least 1.0 m/sec., and the velocity can be selected to be any value larger than 1.0 m/sec. The larger the velocity becomes, the better the results which can be obtained, so long as the treatment of the resins, such as pelletizing means, affords such high velocity. The resins thus extruded through the die are cut into pellets under the water by any known suitable cutting means.

Figure 3:
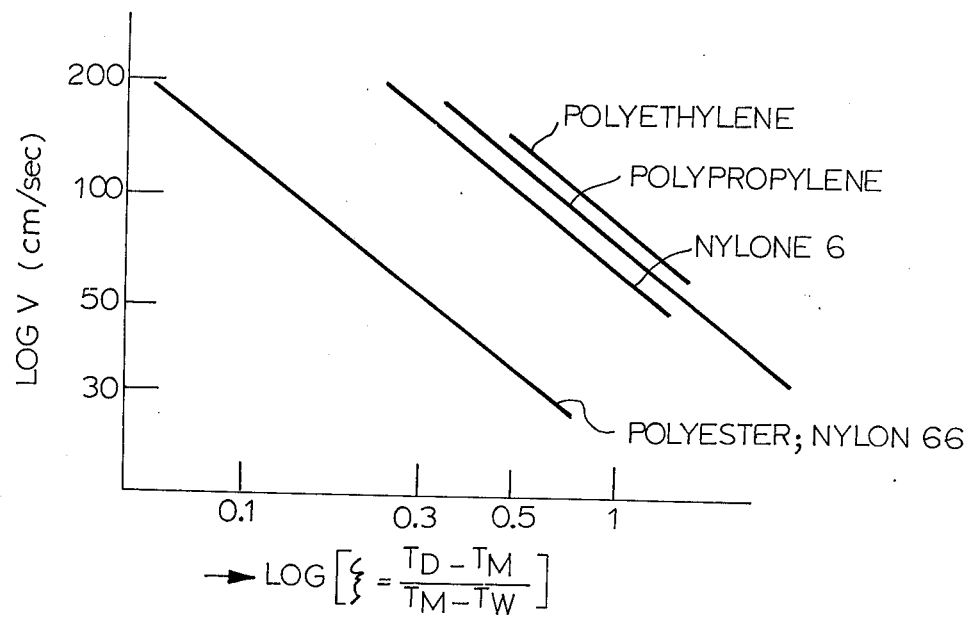
FIGS. 3 and 4 depict interrelationships among system parameters.
Figure 4:
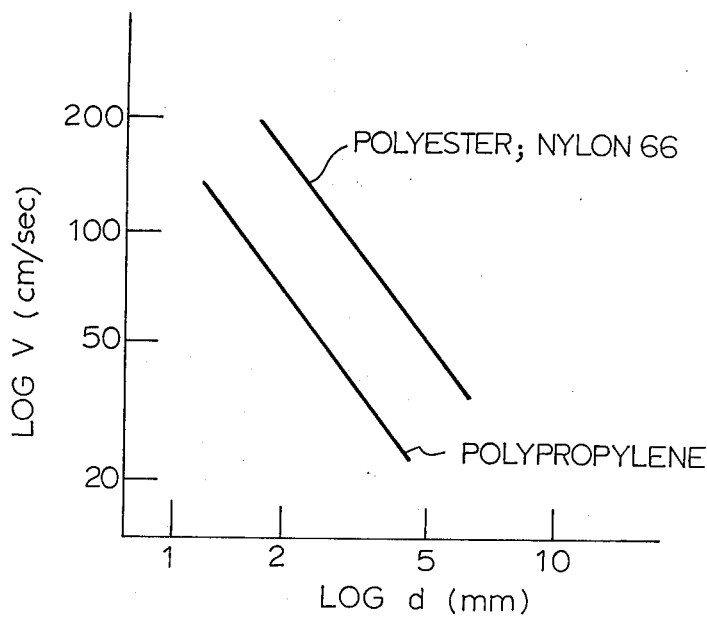

According to the graphs provided in FIGS. 3 and 4, it is understandable that pelletizing under water is possible so long as the parameters reside in the regions above the lines given for respective resins.

In the drawings, $V$ is the velocity; $T_D$ is the die temperature; $T_W$ is the water bath temperature; $T_M$ is the melting temperature of the material; and $D$ is the diameter.

The subject invention can best be appreciated by reference to the following examples.

EXAMPLE 1
UNDER-WATER CUTTING OF POLYESTER RESIN

| | |
|---|---|
| (PETP: MELTING POINT | 260°C.) |
| Dimension of Die | |
| Nozzle Diameter | 4 mm |
| Number of Nozzles | 2 |
| Die Length | 30 mm |
| | |
| Operating Conditions | |
| Temperature of the Die Heating Medium | 300°C. |
| Extrusion Volume | 195 kg/hr. |
| Die Resin Pressure | 75 kg/cm$^2$ |
| Water Temperature | 80°C. |
| Temperature of the Extrusion Resin | 290°C. |
| Die Extrusion Velocity | 190 cm/sec. |

Under the above conditions, pellets having a diameter of about 3.5 mm were obtained.

EXAMPLE 2
UNDER-WATER CUTTING OF NYLON

| | |
|---|---|
| (PA-66 Softening Point: | 262°C.) |
| Dimension of Die | |
| Nozzle Diameter | 4 mm |
| Number of Nozzles | 2 |
| Die Length | 30 mm |
| | |
| Operating Conditions | |
| Temperature of Die Heating Medium | 290°C. |
| Extrusion Volume | 110 kg/hr. |
| Die Resin Pressure | 75 kg/cm$^2$ |
| Water Temperature | 75°C. |
| Temperature of the Extrusion Resin | 285°C. |
| Die Extrusion Velocity | 110 cm/sec. |

Under the above conditions, pellets having a diameter of about 4 mm were obtained.

It should be noted that, as a practical matter, the water temperature should be between 80° and 90°C. When it is below 80°C., the temperature of the die heating medium must be higher than 300°C., whereas if it is above 90°C., such troubles as the fusing of the pellets, the cavitation of the heated water pump, etc. may occur.

Thus, according to the method for extruding the synthetic resins having a high melting point of the present invention, even synthetic resins such as nylon or polyester resins having melting points above 200°C. can be extruded through a die of the conventional under-water cut process, which has been disregarded as not suitable for pelletizing such resins, so that pellets of excellent properties can be obtainable.

Further, the present method has advantages over the conventional sheet cut or strand cut processes in that it saves manual labor, it is less noisy, and it is possible to process the synthetic resins in large quantities.

What is claimed is:
1. A method for pelletizing synthetic resins having high melting points, comprising the steps of:
    extruding said resins under water through nozzles of a die, each nozzle having a constant diameter of at least 3 mm, said resins being extruded at a velocity of at least 1 m/sec., said water temperature being between 80° and 90°C.; and
    cutting said extruded resins into pellets under the water in front of the exits of said nozzles.
2. The method of claim 1, wherein the synthetic resins have melting points of 200°C and above.

* * * * *